United States Patent [19]

Matsuura et al.

[11] Patent Number: 4,703,026

[45] Date of Patent: Oct. 27, 1987

[54] CATALYST COMPONENT FOR POLYMERIZATION OF OLEFINS

[75] Inventors: Mitsuyuki Matsuura; Takashi Fujita, both of Yokkaichi, Japan

[73] Assignee: Mitsubishi Petrochemical Company Limited, Tokyo, Japan

[21] Appl. No.: 872,832

[22] Filed: Jun. 11, 1986

[30] Foreign Application Priority Data

Jun. 11, 1985 [JP] Japan ................................ 60-126943
Jun. 11, 1985 [JP] Japan ................................ 60-126945

[51] Int. Cl.$^4$ .............................................. C08F 4/64
[52] U.S. Cl. .................................... 502/119; 502/118; 502/123; 502/124; 502/125; 502/126; 502/127; 502/134; 526/125
[58] Field of Search ............... 502/118, 119, 123, 124, 502/125, 126, 127, 134

[56] References Cited

U.S. PATENT DOCUMENTS

| | | | |
|---|---|---|---|
| 3,135,809 | 6/1964 | Bosmajian | 502/114 X |
| 3,179,604 | 4/1965 | Ingberman | 502/105 X |
| 3,925,338 | 12/1975 | Ort | 502/123 X |
| 4,157,435 | 6/1979 | Toyota et al. | 502/127 X |
| 4,192,774 | 3/1980 | Kortbeek et al. | 502/105 X |
| 4,325,837 | 4/1982 | Capshen et al. | 502/119 X |
| 4,363,746 | 12/1982 | Capshen | 502/119 X |
| 4,588,703 | 5/1986 | Cowan et al. | 502/125 X |

FOREIGN PATENT DOCUMENTS 8400441 9/1984 Netherlands .

*Primary Examiner*—Patrick P. Garvin
*Attorney, Agent, or Firm*—Oblon, Fisher, Spivak, McClelland & Maier

[57] ABSTRACT

Disclosed is a catalyst component for polymerization of an olefin, which consists essentially of a contact reaction product of (A) a solid composition obtained by mixing and contacting a precipitating agent with a contact reaction product between a magnesium dihalide and a titanium tetraalkoxide and/or a polymer thereof, the addition of the precipitating agent being carried out with stirring at a stirring intensity lower than a level (2nf) two times the floatation limit stirring intensity (nf) of the reaction system, with (B) a liquid titanium compound and/or a halogen compound of silicon.

This catalyst component has a high activity and provides a polymer in which the particle size is relatively large and the particle size distribution is sharply controlled.

25 Claims, No Drawings

CATALYST COMPONENT FOR POLYMERIZATION OF OLEFINS

BACKGROUND OF THE INVENTION

1. Field of the Art

The present invention relates to a transition metal component of a so-called Ziegler type catalyst. According to the present invention, a catalyst component for polymerization of an olefin, which has a high activity and provides a polymer having a relatively large particle size, can be provided.

2. Description of the Prior Art

It has heretofore been known that, if a magnesium compound such as a magnesium halide, a magnesium alkoxide, hydroxymagnesium chloride or a dialkyl magnesium is used as a carrier component, a catalyst having a high activity can be obtained.

When a Ziegler type catalyst comprising this carried catalyst component or alternatively, a solid catalyst component, is used for polymerization of an olefin, an olefin polymer is obtained in the particulate form, but the particle size and particle size distribution of the obtained olefin polymer particles are influenced by the state of particles of the used solid catalyst component. In the olefin polymer particles formed, it is preferred that the particle size be relatively large and the particle size be uniform, because the productivity is increased by increase of the polymer concentration in the formed polymer slurry and facilitation of handling of the polymer slurry.

However, in the above-mentioned high-activity catalyst, it is difficult to control the particle size of the catalyst component, and in many cases, the average particle size is about 5 to about 10 microns and the particle size distribtuion of the catalyst is broad and is not satisfactory.

Accordingly, it is desired in the art to develop a process for preparing a catalyst in which the average particle size of the catalyst is relatively large and more than 10 microns and the particle size distribution can be controlled.

Related prior art techniques are disclosed, for example, in Japanese Patent Application Laid-Open Specifications Nos. 49-65999, 54-41985, 55-2951, 55-135102, 55-135103 and 56-67311.

According to these prior art techniques, a magnesium compound as the carrier component is finely divided or fused and is solidified by spray-drying granulation or rapid cooling. So far as we know, in order to increase the particle size of the catalyst in these known methods, large equipment investment is necessary, and it is considered that the particle size distribution of the formed catalyst is broad in these conventional techniques.

SUMMARY OF THE INVENTION

It is a primary object of the present invention to overcome the above-mentioned defects of the conventional techniques. More specifically, in accordance with the present invention, this object is attained by a catalyst component for polymerization of an olefin, which consists essentially of a contact product of (A) a solid composition obtained by mixing a precipitating agent with a solution of contact product between a magnesium dihalide and a titanium tetraalkoxide and/or a polymer thereof, the addition of the precipitating agent being carried out with stirring at a stirring intensity lower than a level two times the floatation limit stirring intensity (nf) of the reaction system, with (B) a liquid titanium compound and/or a halogen compound of silicon, and with an optional component (C) which is an electron donor.

If polmerization of an olefin is carried out by using this solid catalyst component of the present invention as the transition metal catalyst component of a Ziegler catalyst, the activity is high and a polymer having a relatively large particle size and a controlled particle size distribution can be obtained.

The reason why the activity is enhanced and a polymer having a relatively large particle size and a controlled particle size distribution can be obtained if the catalyst component of the present invention is used has not been completely elucidated, but it is believed that the stirring condition for the synthesis of the component (A) is one of the important conditions.

DETAILED DESCRPTION OF THE PREFERRED EMBODIMENTS

The catalyst component of the present invention consists essentially of a contact reaction product between the component (A) prepared in a specific manner and the component (B).

Component (A)

Composition

The component (A) is a solid composition formed from combination of a magnesium dihalide, a titanium tetraalkoxide and/or a polymer thereof and a precipitating agent.

This solid composition is a solid which is quite different from a magensium dihalide or a complex of a magnesium dihalide with a titanium tetraalkoxide and/or a polymer thereof. The content of this solid composition has not yet been sufficiently analyzed, but from the result of the analysis, it is seen that the solid composition contains titanium, magnesium and a halogen, and when a silicon compound is used, silicon is further contained.

Preparation

The component (A) is prepared by mutual contact of a magnesium dihalide, a titanium tetraalkoxide and/or a polymer thereof and a precipitating agent such as a polymeric silicon compound.

(a) Magnesium Dihalide

For example, there can be mentioned $MgF_2$, $MgCl_2$ and $MgBr_2$. $MgCl_2$ is especially preferred.

(b) Titanium Tetraalkoxide and Polymer Thereof

Titanium tetraalkoxides having 1 to 10 carbon atoms, preferably 2 to 6 carbon atoms, in the alkyl group are used. For example, there can be mentioned $Ti(OC_2H_5)_4$, $Ti(O-isoC_3H_7)_4$, $Ti(O-nC_4H_9)_4$, $Ti(O-nC_3H_7)_4$, $Ti(O-isoC_4H_9)_4$, $Ti[OCH_2CH(CH_3)_2]_4$, $Ti[OC(CH_3)_3]_4$, $Ti(O-nC_5H_{11})_4$, $Ti(O-C_6H_{13})_4$, $Ti(O-nC_7H_{15})_4$ and $Ti[OCH_2CH(C_2H_5)C_4H_9]_4$. Among them, $Ti(OC_2H_5)_4$ and $Ti(O-nC_4H_9)_4$ are preferred.

As the polymer of the titanium tetraalkoxide, there can be mentioned polymers represented by the following formula:

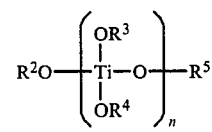

Wherein $R^2$ through $R^5$, which may be the same or different, stand for a hydrocarbon residue, preferably an aliphatic hydrocarbon or aromatic hydrocarbon residue having 1 to 10 carbon atoms, especially preferably an aliphatic hydrocarbon residue having 2 to 6 carbon atoms, and n is a number of at least 2, preferably a number of from 2 to 20.

It is preferred that the number n be selected so that the polytitanic acid ester per se or a solution thereof can be used in the liquid state for the contact with other components. In view of the handling operation, it is preferred that the number n be 2 to 14, especially 2 to 10. As specific examples of the polytitanic acid ester, there can be mentioned normal butyl polytitanate (n=2 to 10), hexyl polytitanate (n= 2 to 10) and normal octyl polytitanate (n=2 to 10). Among these compounds, normal butyl polytitanate is preferred.

(c) Precipitating Agent

As the precipitating agent, there can be used halogenating agents such as titanium tetrachloride and silicon tetrachloride, and polymeric silicon compounds.

As the polymeric silicon compound, there can be mentioned polymers having recurring units represented by the following formula:

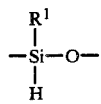

wherein $R^1$ stands for a hydrocarbon residue having 1 to 10 carbon atoms, preferably 1 to 6 carbon atoms.

As specific examples of the polymeric silicon compound having the above-mentioned structural units, there can be mentioned methylhydropolysiloxane, ethylhydropolysiloxane, phenylhydropolysiloxane, cyclohexylhydropolysiloxane, 1,3,5,7-tetramethylcyclotetrasiloxane and 1,3,5,7,9-pentamethylcyclopentasiloxane.

The viscosity of the polymeric silicon compound is not particularly critical. However, in view of the handling operation, it is preferred that the viscosity be about 0.1 to about 100 centistokes (cSt). Although the terminal structure of the hydropolysiloxane has no substantial influence, it is preferred that the terminals of the hydropolysiloxane be blocked with an inactive group such as a trialkylsilyl group.

In addition to the above-mentioned components, a small amount of an alcohol and/or an organic acid ester may be preferably used. Preferred examples of the alcohol and ester are illustrated, for example, in Japanese Patent Publication No. 54-23394 and Japanese Patent Application Laid-Open Specification No. 59-80406.

(d) Contact of Respective Components
(Ratio)

The amounts used of the respective components are not particularly critical, so far as the intended effects of the present invention can be attained, but the following amounts are generally preferred.

The amount used of the titanium tetraalkoxide and/or its polymer is preferably 0.1 to 10 moles, especially preferably 1 to 4 moles, per mole of the magnesium dihalide. It is particularly preferred that the amount used of the titanium tetraalkoxide and/or its polymer be 2 to 3 moles per mole of the magnesium dihalide. The mixing ratio between the two components is preferably adjusted so that the magnesium dihalide is substantially dissolved in the titanium tetraalkoxide and/or its polymer.

It is preferred that the amount used of the precipitating agent such as the polymeric silicon compond be $1 \times 10^{-2}$ to 100 moles, particularly 0.1 to 10 moles, more particularly 1 to 4 moles, per mole of the magnesium dihalide. (Contact Method)

The component (A) of the present invention can be obtained by contacting the foregoing three components. The contact of the three components can be accomplished according to a known method. Generally, the contact is carried out at $-100°$ to $200°$ C. for about 10 minutes to about 20 hours.

The component (A) of the present invention is a solid composition obtained by contacting a liquid contact product between the magnesium dihalide and the titanium tetraalkoxide and/or its polymer with the precipitating agent such as the polymeric silicon compound. The condition for the contact with the polymeric silicon compound is important. Namely, in the present invention, it is important that the contact should be carried out at an intensity of agitation in view, for example, of rotation of a vaned stirrer smaller than a level 2 times the floating limit stirring intensity (nf) of the precipitated particles of the solid compositions, preferably at a rotation number smaller than nf. The lower limit of the stirring intensity is nf/15, preferably nf/10.

According to one preferred embodiment of the present invention, when the precipitating agent is added to the contact product between the magnesium dihalide and the titanium tetraalkoxide and/or its polymer, the viscosity of the reaction system is adjusted to 20 to 50 centipoise (cP), and the stirring intensity is 2 nf or lower, preferably smaller than nf, while it is at or larger than nf/15, preferably nf/10.

The floatation limit stirring intensity (nf) herein means the minimum stirring intensity at which residence of the precipitate in the tank bottom is not caused. In the present invention, the floatation limit stirring intensity is one at the final stage of the step of precipitating the solid component by the addition of the precipitating agent.

Ordinarily, the stirring intensity is defined by the rotation rate of the stirring vane and the rotation rate at the floating limit stirring intensity (nf) is determined according to the following equation [Chemical Engineering, 17, 144 (1953)]:

$$nf = KD^{-\frac{2}{3}} d_p^{\frac{1}{3}} \left( \frac{\rho_p - \rho_c}{\rho_c} \right)^{\frac{1}{3}} \left( \frac{\mu}{\rho_c} \right)^{-1/9} \left( \frac{V_p'}{V_p} \right)^{-0.7}$$

wherein K is a coefficient, D stands for the tank diameter (m), $d_p$ stands for the particle diameter (mm), $\sigma_p$ stands for the density (g/cm$^3$) of the particles, $\sigma_c$ stands for the density (g/cm$^3$) of the liquid, $\mu$ stands for the viscosity (cP) of the liquid, $V_p'$ stands for the bulk volume of the particles and $V_p$ stands for the true volume of the particles.

Known stirring is ordinarily carried out at a rotation rate much larger than nf. On the other hand, in the present invention, a rotation rate at or smaller than 2nf, preferably smaller than nf, is used. If stirring is carried out at a rotation rate close to nf, the particle size distribution of particles formed is ordinarily broad and is not preferred, but it has unexpectedly been found that, according to the present invention, the particle size distribution is not broadened but particles having a sharp particle size distribution can be obtained. Especially preferred results can be obtained in the present invention if the viscosity of the reaction system is adjusted within the specific range. Also the viscosity is an important factor determining the particle size and particle size distribution of the particles formed. The causes are now being examined.

The contact of the three components may be carried out in the presence of a dispersion medium. Hydrocarbons, halogenated hydrocarbons and dialkylsiloxanes may be used as the dispersion medium. As the hydrocarbon, there can be mentioned hexane, heptane, toluene and cyclohexane, and as the halogenated hydrocarbon, there can be mentioned n-butyl chloride, 1,2-dichloroethylene, carbon tetrachloride and chlorobenzene. As the dialkylpolysiloxane, there can be mentioned dimethylpolysiloxane and methylphenylpolysiloxane.

It is to be understood that, in the present invention, by "a solution of a contact product between the magnesium dihalide and the titanium tetraalkoxide and/or its polymer" is meant not only a solution of the contact product in the above-mentioned dispersion medium but also the liquid product per se, in which the magnesium dihalide which is inherently solid is dissolved in the titanium tetraalkoxide and/or its polymer to form a liquid.

Component (B)

The component (B) is a liquid titanium compound and/or a halogen compound of silicon.

(1) Liquid Titanium Compound

By the term "liquid" is meant not only a titanium compound which itself is liquid (a compound rendered liquid by forming a complex is included) but also a titanium compound which is liquid in the form of a solution.

As a typical compound, there can be mentioned a compound represented by the formula $Ti(OR)_{4-n}X_n$ in which R stands for a hydrocarbon residue having preferably 1 to 10 carbon atoms, X stands for a halogen atom and n is a number of from 0 to 4.

As specific examples, there can be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(O—iC_3H_7)Cl_3$, $Ti(O—nC_4H_9)Cl_3$, $Ti(O—nC_4H_9)Cl_2$, $Ti(OC_2H_5)Br_3$, $Ti(OC_2H_5)(OC_4H_9)_2Cl$, $Ti(O—nC_4H_9)_3Cl$, $Ti(OC_6H_5)Cl_3$, $Ti(O—iC_4H_9)_2Cl_2$, $Ti(OC_5H_{11})Cl_3$, $Ti(OC_6H_{13})Cl_8$, $Ti(OC_2H_5)_4$, $Ti(O—nC_3H_7)_4$, $Ti(O—iC_3H_7)_4$, $Ti(O—nC_4H_9)_4$, $Ti(O—iC_4H_9)_4$, $Ti[OCH_2CH(CH_3)_2]_4$, $Ti[OC(CH_3)_3]_4$, $Ti(O—nC_5H_{11})_4$, $Ti(O—nC_6H_{13})_4$, $Ti(O—nC_7H_{15})_4$, $Ti[OCH(C_3H_7)_2]_4$, $Ti[OCH(CH_3)C_4H_9]_4$, $Ti(O—nC_8H_{17})_4$, $Ti(O—nC_{10}H_{21})_4$ and $Ti[OCH_2CH(C_2H_5)C_4H_9]_4$.

Furthermore, a molecule compound obtained by reacting $TiX'_4$ in which X' stands for a halogen atom with an electron donor may be used as the titanium compound. For example, there can be mentioned $TiCl_4 \cdot CH_3COC_2H_5$, $TiCl_4 \cdot CH_3CO_2C_2H_5$, $TiCl_4 \cdot C_6H_5NO_2$, $TiCl_4 \cdot CH_3COCl$, $TiCl_4 \cdot C_6H_5COCl$, $TiCl_4 \cdot C_6H_5CO_2C_2H_5$, $TiCl_4 \cdot ClCO_2C_2H_5$ and $TiCl_4 \cdot C_4H_4O$.

(2) Halogen Compound of Silicon

A compound of the formula $R_{4-n}SiX_n$ in which R stands for a hydrogen atom or a hydrocarbon residue or alkoxy group having 1 to 6 carbon atoms, preferably 1 to 4 carbon atoms, X stands for a halogen atom and n is a number of from 1 to 4 is used.

As specific examples, there can be mentioned $SiCl_4$, $HSiCl_3$, $CH_3SiCl_3$, $SiBr_4$, $(C_2H_5)_2SiCl_2$, $(CH_3)_3SiCl$, $Si(OCH_3)Cl_3$, $Si(OC_2H_5)Cl_3$ and $Si(OC_2H_5)_2Cl_2$. The polymeric silicon compound used for the synthesis of the component (A) may be used in combination with the above-mentioned halogen compound of silicon.

In accordance with another embodiment of the present invention, the catalyst component for polymerization of an olefin is prepared by using an electron donor [component (C)] in combination with the above-mentioned components (A) and (B). If the component (C) is used in combination with the components (A) and (B), the obtained catalyst component for polymerization of an olefin has a high activity and can provide a polymer in which the particle size is relatively large and the particle size distribution is controlled. The so-obtained transition metal component of a Ziegler catalyst can maintain the stereoregularity of the polymer obtained at a very high level.

Component (C) (optional)

As the electron donor (C), there may be used oxygen-containing electron donors such as alcohols, phenols, ketones, aldehydes, carboxylic acids, esters of organic and inorganic acids, ethers, acid amides, acid anhydrides and acid halides, and nitrogen-containing electron donors such as ammonia, amines, nitriles and isocyanates.

More specifically, there may be mentioned alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; phenols having 6 to 25 carbon atoms, which can have an alkyl group, such as phenol, cresol, xylenol, ethylphenol,-propylphenol, cumylphenol, nonylphenol and naphthol; ketones having 3 to 15 carbon atoms such as acetone, methylethyl ketone, methylisobutyl ketone, acetophenone and benzophenone; aldehydes having 2 to 15 carbon atoms, such as acetaldehyde, propionaldehyde, octylaldehyde, benzaldehyde, tolualdehyde and naphthaldehyde; organic acid esters having 2 to 20 carbon atoms, such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarin, phthalide and ethylene carbonate; inorganic acid esters such as ethyl silicate, butyl silicate and phenyltriethoxysilane; acid halides having 2 to 15 carbon atoms, such as acetyl chloride, benzoyl chloride, phthaloyl chloride, isophthaloyl chloride, toluyloyl chloride and anisolyl chloride; ethers having 2 to 20 carbon atoms, such as methyl ether, ethyl ether, isopropyl ether, butyl ether, amyl ether, tetrahydrofuran, anisol and diphenyl ether; acid amides such as benzoic acid amide, acetic acid amide and toluylic acid amide; amines such as methylamine, ethylamine, diethylamine, tributylamine, piperidine, tribenzylamine, aniline, pyridine, picoline and tetramethylethylene-diamine; and nitriles such as acetonitrile, benzonitrile and tolunitrile.

These electron donors may be used singly or in the form of a mixture of two or more of them.

Preparation of Catalyst Component

The catalyst component of the present invention is a contact reaction product of the components (A) and (B), optionally with the component (C).

(1) Weight Ratio

The amounts used of the respective components are not restricted, so far as the intended effects of the present invention can be attained, but it is generally preferred that the amounts used of the respective components be as described below.

The amount used of the component (B) is $1 \times 10^{-3}$ to 100 moles, preferably $1 \times 10^{-2}$ to 10 moles, per mole of the magnesium dihalide of the component (A).

When the component (C) is used, the amount used of the component (C) is adjusted to $1 \times 10^{-4}$ to 10 moles, preferably $1 \times 10^{-3}$ to 5 moles, per mole of the magnesium chloride of the component (A).

(2) Contact Method

The catalyst component of the present invention is obtained by contacting the component (A) with the component (B), optionally together with the component (C). Ordinarily, the contact is carried out at a temperature of $-100°$ to $200°$ C. for 10 minutes to about 20 hours.

The contact of the component (A) with the component (B), optionally with the component (C), is preferably carried out with stirring. Furthermore, the contact can be accomplished by mechanical pulverization using a ball mill or a shaking mill.

The contact of the component (A) with the component (B), optionally with the component (C), may be carried out in the presence of a dispersion medium. An appropriate dispersion medium is selected from the dispersion media exemplified hereinbefore with respect to the preparation of the component (A).

Polymerization of Olefin (1) Formation of Catalyst

The catalyst component of the present invention will be combined with an organic metal compound as the co-catalyst to make up a catalyst for use in polymerization of an olefin.

Any of organic compounds of metals of the groups I through IV of the Periodic Table, known as the cocatalyst, can be used in the present invention, and organoaluminum compounds are especially preferred.

As the organic aluminum compound, there can be mentioned compounds represeented by the formulae $R^6{}_{3-n}AlX_n$ and $R^7{}_{3-m}Al(OR^8)_m$ (in which $R^6$ and $R^7$, which may be the same or different, stand for a hydrocarbon residue having 1 to about 20 carbon atoms or a hydrogen atom, $R^8$ stands for a hydrocarbon residue as mentioned above, n is a number of from 0 to 2 and m is a number of from 0 to 1. As specific examples, there can be mentioned (a) trialkyl aluminum compounds such as trimethyl aluminum, triethyl aluminum, tri-isobutyl aluminum, trihexyl aluminum, trioctyl aluminum and tridecyl aluminum, (b) alkyl aluminum halides such as diethyl aluminum monochloride, di-isobutyl aluminum monochloride, ethyl aluminum sesquichloride and ethyl aluminum dichloride, (c) dialkyl aluminum hydrides such as diethyl aluminum hydride and di-isobutyl aluminum hydride, and (d) alkyl aluminum alkoxides such as diethyl aluminum ethoxide, diethyl aluminum butoxide and diethyl aluminum phenoxide.

The organoaluminum compounds (a) through (c) may be used in combination with an organometal compound, for example, an alkylaluminum alkoxide represented by the formula $R^9{}_{3-a}Al(OR^{10})_a$ in which a is a number of from 1 to 3, and $R^9$ and $R^{10}$, which may be the same or different, stand for a hydrocarbon residue having 1 to about 20 carbon atoms. For example, there can be mentioned combined use of triethyl aluminum and diethyl aluminum ethoxide, combined use of diethyl aluminum monochloride and diethyl aluminum ethoxide, combined use of ethyl aluminum dichloride and ethyl aluminum diethoxide, and combined use of triethyl aluminum, diethyl aluminum ethoxide and diethyl aluminum chloride.

Th amount used of the organometal compound is not particularly critical, but it is preferred that the weight ratio of the organometal compound to the solid catalyst component be in the range of from 0.5 to 1,000.

Addition of an electron donor such as an ether, an ester, an amine or a silane compound at the time of polymerization may be efective for improving the stereoregularity of a polymer of an olefin having at least 3 carbon atoms. The amount of the electron donor used for attaining this object is 0.001 to 2 moles, preferably 0.01 to 1 mole, per mole of the organic aluminum compound. As specific examples of the electron donor used for attaining this object are disclosed in Japanese Patent Application Laid-Open Specifications Nos. 55-127406, 56-139511 and 57-63310.

(3) Olefin

The olefin polymerized by the catalyst system of the present invention is an olefin represented by the general formula $R—CH=CH_2$ wherein R stands for a hydrogen atom or a hydrocarbon residue having 1 to 10 carbon atoms, which may have a branch group. As specific examples, there can be mentioned ethylene, propylene, butene-1, pentene-1, hexene-1 and 4-methylpentene-1. Copolymerization of ethylene with up to 50% by weight, preferably up to 20% by weight of other olefin as mentioned above may be carried out, and copolymerization of propylene with up to 30% by weight of other olefin as mentioned above may be carried out. Moreover, copolymerization with other copolymerizable monomer such as vinyl acetate or a diolefin may be carried out.

(3) Polymerization

The catalyst system of the present invention can be applied not only to the ordinary slurry polymerization but also to the liquid phase solvent-free polymerization, the solution polymerization and the gas phase polymerization. Furthermore, the catalyst system of the present invention may be used for the continuous polymerization, the batchwise polymerization and the polymerization including preliminary polymerization. As the polymerization solvent used for the slurry polymerization, there can be mentioned saturated aliphatic and aromatic hydrocarbons such as hexane, heptane, pentane, cyclohexane, benzene and toluene. These solvents may be used singly or in the form of mixtures of two or more of them. The polymerization is carried out at room temperature to about $200°$ C., preferably $50°$ to $150°$ C. Hydrogen may be auxiliarily used as a molecular weight modifier.

EXAMPLES

The present invention will now be described in detail with reference to the following examples that by no means limit the scope of the invention.

EXAMPLE 1

(1) Synthesis of Component (A)

A flask having an inner diameter of 10 cm, the inner atmosphere of which had been amply substituted by nitrogen, was charged with 20 ml of n-heptane from which water and oxygen had been removed, and 0.1mole of $MgCl_2$ and 0.2 mole of $Ti(O-nC_4H_9)_4$ were introduced into the flask and reaction was carried out at 95° C. for 1 hour. The diameter of a stirring vane of the stirrer used was 6 cm. After completion of the reaction, the temperature was lowered to 40° C. and 15 ml of methylhydrogenpolysiloxane was introduced into the flask and reaction was carried out at a rotation rate of the stirrer of 100 rpm (rotations per minute) for 3 hours.

After completion of the reaction, the solid product formed as the component (A) was washed with n-hepane. A part of the solid product was sampled and the average particle size was measured according to the sedimentation method to be 17.4 microns. The floating limit stirring intensity (nf) of the stirring system in this example was 97 rpm. Accordingly, the stirring intensity was 1.03 nf (=100/97).

(2) Preparation of Catalyst Component

The above-mentioned component (A) was introduced into an amply purified flask, and a mixture of 4.4 ml of $TiCl_4$ (B) and 12 ml of methylhydrogenpolysiloxane in 50 ml of n-heptane was introduced into the flask at 30° C., and reaction was carrried out at 70° C. for 2 hours. After completion of the reaction, the reaction product obtained was washed with n-heptane to form a catalyst component of the present invention. The Ti content in this catalyst component was 14.1% by weight.

(3) Polymerization of Ethylene

A stainless steel autoclave provided with a stirrer and a temperature-controlling device and having an inner volume of 1.5 liters was charged with 800 ml of n-heptane, from which water and oxygen had been amply removed, and then, 100 mg of triethylaluminum and 5 mg of the catalyst component mentioned above were introduced into the autoclave.

The temperature was elevated to 85° C., and hydrogen was introduced under a partial pressure of 4 $kg/cm^2$ and ethylene was introduced under a partial pressure of 5 $kg/cm^2$ so that the total pressure was 9 $kg/cm^2G$. Polymerization was conducted for 3 hours. The polymerization conditions were kept constant during the polymerization. After completion of the polymerization, ethylene and hydrogen were purged, and the content was taken out from the autoclave. The polymer slurry was filtered, and the solid recovered was dried a whole day and night to obtain 73 g of a polymer having a melt flow rate (MFR) of 4.4 g/10 min, a bulk density of 0.45 g/cc and an average particle size of 396 microns. The amount of particles having a size smaller than 63 microns was a trace, the amount of particles having a size smaller than 149 microns was 1.1% by weight, and the amount of particles having a size larger than 1,000 microns was 0.2% by weight.

EXAMPLE 2

(1) Synthesis of Component (A)

In a flask purified in the same manner as described in Example 1 was introduced 40 ml of n-heptane purified in the same manner as described in Example 1, and $MgCl_2$ and $Ti(O-nC_4H_9)_4$ were introduced and reacted in the same manner as described in Example 1. The diameter of a stirring vane of the stirrer used was 6 cm. After completion of the reaction, the temperature was lowered to 40° C., and 30 ml of methylhydrogenpolysiloxane was introduced and reaction was carried out at a rotation rate of the stirrer of 120 rpm for 3 hours. After completion of the reaction, the solid product formed was washed with n-heptane into the solid component (A). A part of the solid component (A) was sampled and the average particle size was measured according to the sedimentation method to be 16.3 microns.

The rotation rate corresponding to nf was 100 rpm, and the stirring intensity is 1.2 nf.

(2) Preparation of Catalyst Component

The above-mentioned component (A) was introduced into a flask amply purified in the same manner as described in Example 1. A mixture of 11.5 ml of $TiCl_4$ with 10 ml of n-heptane was introduced into the flask at 0° C. over a period of 30 minutes, and reaction was carried out at 50° C. for 2 hours. After completion of the reaction, the reaction product was washed with n-heptane to obtain a catalyst component. The Ti content in the catalyst component was 10.8% by weight.

(3) Polymerization of Ethylene

Polymerization of ethylene was carried out under the same conditions as described in Example 1 except that 100 mg of triethylaluminum and 50 mg of diethylaluminum chloride were used instead of 100 mg of triethylaluminum, whereby was obtained 161.5 g of a polymer having a melt flow rate of 4.5 g/10 min, a bulk density of 0.43 g/cc and an average particle size of 437 microns.

EXAMPLE 3

(1) Synthesis of Component (A)

Into a flask purified in the same manner as described in Example 1 was introduced 40 ml of n-heptane purified in the same manner as described in Example 1, and $MgCl_2$ and $Ti(O-nC_4H_9)_4$ were introduced into the flask in the same manner as described in Example 1. Then, 0.7 ml of n-BuOH was introduced into the flask and reaction was carried out in the same manner as described in Example 1. The diameter of a stirring vane of the stirrer used was 6 cm, and the rotation rate of the stirrer was 140 rpm. After completion of the reaction, the reaction product was washed with n-heptane to form a component (A). The average particle size of the component (A) was 15.9 microns.

The rotation rate corresponding to nf was 100 rpm, the stirring intensity being 1.0.

(2) Preparation of Catalyst Component

The component (A) synthesized above was introduced in an amply purified flask, and a mixture of 3.2 ml of $SiCl_4$ with 10ml of n-heptane was introduced at 30° C. over a period of 30 minutes into the flask. Reaction was carried out at 50° C. for 2 hours. Then, a mixture of 8.0 ml of $TiCl_4$ with 50 ml of n-heptane was introduced into the flask at 30° C. over a period of 30 minutes and reaction was carried out at 50° C. for 2 hours. After completion of the reaction, the reaction product was washed with n-heptane to form a catalyst component.

The Ti content in the catalyst component was 5.82% by weight.

(3) Polymerization of Ethylene

Polymerization of ethylene was carried out under the same conditions as described in Example 1 except that the amount used of triethylaluminum was changed to 150 mg, whereby was obtained 226 g of a polymer having a melt flow rate of 4.7 g/10 min, a bulk density of 0.43 g/cc and an average particle size of 436 microns.

EXAMPLE 4

(1) Preparation of Catalyst Component

The component (A) was prepared in the same manner as described in Example 1. A mixture of 7.1 ml of $SiCl_4$ with 10 ml of n-heptane was introduced into the flask of the component (A) at 30° C. over a period of 1 hour and reaction was carried out at 50° C. for 2 hours. After completion of the reaction, the reaction product was washed with n-heptane to obtain a catalyst component. The Ti content in the catalyst component was 3.81% by weight.

(2) Polymerization of Ethylene

Polymerization of ethylene was carried out under the same conditions as described in Example 1 except that 200 mg of triisobutylaluminum was used instead of triethylaluminum, whereby was obtained 82 g of a polymer having a melt flow rate of 7.1 g/10 min, a bulk density of 0.45 g/cc and an average particle size of 331 microns.

EXAMPLE 5

Polymerization of propylene was carried out by using the catalyst component as synthesized in Example 2.

A stainless steel autoclave provided with a stirrer and a temperature-controlling device and having an inner volume of 1.5 liters was charged with 500 ml of n-heptane, from which water and oxygen had been amply removed, 125 mg of triethylaluminum, 53.6 mg of diphenyldimethoxysilane and 15 mg of the catalyst component synthesized as in Example 2. Then, 40 ml of $H_2$ was introduced into the autoclave and the temperature and pressure were elevated, and polymerization was carried out under a polymerization pressure of 5 kg/cm$^2$G at a polymerization temprature of 75° C. for a polymerization time of 2 hours. After completion of the polymerization, the polymer slurry obtained was filtered, and the polymer separated was dried to obtain 96 g of a polymer. Furthermore, 5.9 g of a polymer was obtained from the filtrate. At the boiling heptane extraction test, it was found that the I.I. value of the whole product was 86.3% by weight. The melt flow rate was 11.5 g/10 min, the bulk density of the polymer was 0.45 g/cc, and the average particle size of the polymer was 336 microns.

EXAMPLE 6

A gas phase polymerization apparatus as disclosed in Example 1 of Japanese Patent Application Laid-Open Specification No. 57-73011 was used, and amply purified polyethylene powder was charged in the apparatus and 100 mg of triethylaluminum and 10 mg of the catalyst component as synthesized in Example 1 were then introduced into the apparatus. Then, $H_2$ was introduced under a partial pressure of 1.2 kg/cm$^2$ and introduction of ethylene was started at 85° C. Polymerization was carried out at 85° C. under a total pressure of 9 Kg/cm$^2$ for 2.5 hours, whereby was obtained 151 g of a polymer having a melt flow rate of 1.8 g/10 min and an average particle size of 368 microns.

COMPARATIVE EXAMPLE 1

(1) Preparation of Catalyst Component

A catalyst component was prepared in the same manner as described in Example 1 except that the stirring rotation rate was changed to 300 rpm at the time of contact with methylhydrogenpolysiloxane. After completion of the reaction, the solid product formed was washed with n-heptane, and when a part of the solid product was sampled and the average particle size was measured, it was found that the particle size was 8.6 microns. The rotation rate corresponding to nf was 97 rpm, the stirring intensity thus being 3.1.

(2) Polymerization of Ethylene

By using the so-obtained catalyst component, polymerization of ethylene was carried out under the same conditions as described in Example 1, whereby was obtained 78 g of a polmer having a melt flow rate of 4.1 g/10 min, a bulk density of 0.47 g/cc and an average particle size of 179 microns.

EXAMPLE 7

(1) Preparation of Component (A)

The reaction of $MgCl_2$ with $Ti(O-nC_4H_9)_4$ for the production of the component (A) was carried out in the same manner as described in Example 1. After completion of the reaction, the temperature was lowered to 10° C. and at a stirring rotation rate of 120 rpm, 0.2 mole of $SiCl_4$ was introduced over a period of 1 hour and reaction was carried out at 30° C. for 3 hours. After completion of the reaction, the reaction product was amply washed with n-heptane. The average particle size was 14.6 microns and the Ti content was 3.52% by weight. The rotation number corresponding to nf was 98 rpm, the stirring intensity thus being 1.2.

(2) Polymerization of Ethylene

Polymerization was carrried out under the same conditions as described in Example 1. Incidentally, the component (A) was directly used as the catalyst component. As the result, 81 g of a polymer having a melt flow rate of 5.6 g/10 min, a bulk density of 0.40 g/cc and an average particle size of 358 microns was obtained.

EXAMPLE 8

Copolymerization of ethylene with butene-1 was conducted.

Polymerization was carried out under the same conditions as described in Example 1 except that an ethylene/butene-1 gaseous mixture containing 10% by volume of butene-1 was used instead of ethylene and the polymerization temperature was changed to 75° C., whereby was obtained 101 g of a polymer having a melt flow rate of 6.2 g/10 min, a bulk density of 0.43 g/cc. an average particle size of 401 microns and a density of 0.921 g/cm3.

EXAMPLE 9

(1) Synthesis of Component (A)

A flask having an inner diameter of 10 cm, the inner atmosphere of which had been amply substituted by nitrogen, was charged with 100 ml of n-heptane from which water and oxygen had been removed, and 0.1 mole of MgCl$_2$ and 0.2 mole of Ti(O—nC$_4$H$_9$)$_4$ were charged into the flask and reaction was carried out at 95° C. for 1 hour. The diameter of a stirring vane of the stirrer used was 6 cm. After completion of the reaction, the temperature was lowered to 40° C. and 15 ml of methylhydrogenpolysiloxane was introduced, and reaction was carried out at a stirring rotation rate of the stirrer of 20 rpm for 3 hours.

After completion of the reaction, the solid product formed was washed with n-heptane. A part of the solid product was sampled and the average particle size was measured by the sedimentation method to be 24.5 microns.

The rotation rate corresponding to the floatation limit stirring intensity (nf) was 104 rpm, the stirring intensity thus being 0.2.

(2) Preparation of Catalyst Component

The above-mentioned component (A) was introduced into an amply purified flask, and a mixture of 4.4 ml of TiCl$_4$ and 12 ml of methylhydrogenpolysiloxane in 50 ml of n-heptane was introduced into the flask at 30° C., and reaction was carried out at 70° C. for 2 hours. After completion of the reaction, the reaction product obtained was washed with n-heptane to form a catalyst component. The Ti content in this catalyst component was 14.5% by weight.

(3) Polymerization of Ethylene

A stainless steel autoclave provided with a stirrer and a temperature-controlling device and having an inner volume of 1.5 liters was charged with 800 ml of n-heptane from which water and oxygen had been amply removed, and then, 100 mg of triethylaluminum and 5 mg of the catalyst component synthesized as mentioned above were introduced into the autoclave.

The temperature was elevated to 85° C., and hydrogen was introduced under a partial pressure of 4 Kg/cm$^2$ and ethylene was introduced under a partial pressure of 5 Kg/cm2 so that the total pressure was 9 Kg/cm$^2$G. Polymerization was conducted for 3 hours. The polymerization conditions were kept constant during the polymerization. After completion of the polymerization, ethylene and hydrogen were purged, and the content was taken out from the autoclave. The polymer slurry was filtered, and the solid recovered was dried a whole day and night to obtain 71 g of a polymer having a melt flow rate of 4.3 g/10 min, a bulk density of 0.42 g/cc and an average particle size of 483 microns. The amount of particles having a size smaller than 63 microns was a trace, the amount of particles having a size smaller than 149 microns was 0.7% by weight, and the amount of particles having a size larger than 1,000 microns was 0.5% by weight.

EXAMPLE 10

(1) Synthesis of Component (A)

In a flask purified in the same manner as described in Example 9 was introduced 80 ml of n-heptane purified in the same manner as described in Example 9 and MgCl$_2$ and Ti(O—nC$_4$H$_9$)$_4$ were introduced and reacted in the same manner as described in Example 9. The diameter of the used stirring vane was 9 cm. After completion of the reaction, the temperature was lowered to 35° C., and 30 ml of methylhydrogenpolysiloxane was introduced and reaction was carried out at a rotation rate of 15 rpm for 3 hours. After completion of the reaction, the solid product formed was washed with n-heptane into a solid component (A). A part of the solid component (A) was sampled and the average particle size was measured according to the sedimentation method to be 25.8 mocrons.

The rotation rate corresponding to nf was 100 rpm, the stirring intensity thus being 0.15.

(2) Preparation of Catalyst Component

The above-mentioned component (A) was introduced into a flask amply purified in the same manner as described in Example 9. A mixture of 11.5 ml of TiCl$_4$ with 10 ml of n-heptane was introduced into the flask at 0° C. over a period of 30 minutes, and reaction was carried out at 50° C. for 2 hours. After completion of the reaction, the reaction product was washed with n-heptane to obtain a catalyst component. The Ti content in the catalyst component was 10.7% by weight.

(3) Polymerization of Ethylene

Polymerization of ethylene was carried out under the same conditions as described in Example 9 except that 100 mg of triethylaluminum and 50 mg of diethylaluminum chloride were used instead of 100 mg of triethylaluminum, whereby was obtained 156.3 g of a polymer having a melt flow rate of 4.3 g/10 min, a bulk density of 0.40 g/cc and an average particle size of 625 microns.

EXAMPLE 11

(1) Synthesis of Component (A)

Into a flask purified in the same manner as described in Example 9 was introduced 150 ml of n-heptane purified in the same manner as described in Example 9, and MgCl$_2$ and Ti(O—nC$_4$H$_9$)$_4$ were introduced into the flask in the same manner as described in Example 9. Then, 0.7 ml of n—BuOH was introduced into the flask and reaction was carried out in the same manner as described in Example 9. The diameter of the stirring vane was 6 cm, and the stirring rotation rate was 10 rpm. After completion of the reaction, the reaction product was washed with n-heptane to form a component (A). The average particle size of the component (A) was 26.2 microns.

The rotation rate corresponding to nf was 107 rpm, the stirring intensity thus being 0.09.

(2) Preparation of Catalyst Component

The component (A) synthesized above was introduced in an amply purified flask, and a mixture of 3.2 ml of SiCl$_4$ with 10 ml of n-heptane was introduced at 30° C. over a period of 30 minutes into the flask. Reaction was carried out at 50° C. for 2 hours. Then, a mixture of 8.0 ml of TiCl$_4$ with 50 ml of n-heptane was introduced into the flask at 30° C. over a period of 30 minutes and reaction was carried out at 50° C. for 2 hours. After completion of the reaction, the reaction product was washed with n-heptane to form a catalyst component. The Ti content in the catalyst component was 5.14% by weight.

(3) Polymerization of Ethylene

Polymerization of ethylene was carried out under the same conditions as described in Example 9 except that the amount used of triethylalmuinum was changed to 150 mg, whereby was obtained 221 g of a polymer having a melt flow rate of 4.8 g/10 min, a bulk density of 0.42 g/cc and an average particle size of 558 microns.

EXAMPLE 12

(1) Preparation of Catalyst Compound

The component (A) was prepared in the same manner as described in Example 9. A mixture of 7.1 ml of SiCl$_4$ with 10 ml of n-heptane was introduced into the flask at 30° C. over a period of 1 hour and reaction was carried out at 50° C. for 2 hours. After completion of the reaction, the reaction product was washed with n-heptane to obtain a catalyst component. The Ti content in the catalyst component was 3.78% by weight.

(2) Polymerization of Ethylene

Polymerization of ethylene was carried out under the same conditions as described in Example 9 except that 200 mg of triisobutylaluminum was used instead of triethylaluminum, whereby was obtained 81 g of a polymer having a melt flow rate of 7.3 g/10 min, a bulk density of 0.45 g/cc and an average particle size of 498 microns.

EXAMPLE 13

Polymerization of propylene was carried out by using the catalyst component synthesized in Example 10.

A stainless steel autoclave provided with a stirrer and a temperature-controlling device and having an inner volume of 1.5 liters was charged with 500 ml of n-heptane from which water and oxygen had been amply removed, 125 mg of triethylaluminum, 53.6 mg of diphenyldimethoxysilane and 15 mg of the catalyst commponent synthisized in Example 10. Then, 40 ml of H$_2$ was introduced into the autoclave and the temperature and pressure were elevated, and polymerization was carried out under a polymerization pressure of 5 Kg/cm$^2$G at a polymerization temperature of 75° C. for a polymerization time of 2 hours. After completion of the polymerization, the polymer slurry obtained was filtered, and the polymer separated was dried to obtain 95 g of a polymer. Furthermore, 5.5 g of a polymer was obtained from the filtrate. At the boiling heptane extraction test, it was found that the I.I. value of the whole product was 86.9% by weight. The melt flow rate was 9.6 g/10 min, the bulk density of the polymer was 0.44 g/cc, and the average particle size of the polymer was 371 microns.

EXAMPLE 14

A gas phase polymerization apparatus as disclosed in Example 1 of Japanese Patent Application Laid-Open Specification No. 57-73011 was used, and sufficiently purified polyethylene powder was charged in the apparatus and 100 mg of triethylaluminum and 10 mg of the catalyst component synthesized in Example 9 were then introduced into the apparatus. Then, H$_2$ was introduced under a partial pressure of 1.2 Kg/cm$^2$ and introduction of ethylene was started at 85° C. Polymerization was carried out at 85° C. under a total pressure of 9 Kg/cm$^2$ for 2.5 hours, whereby was obtained 154 g of a polymer having a melt flow rate 1.9 g/10 min and an average particle size of 503 microns.

COMPARATIVE EXAMPLE 2

(1) Preparation of Catalyst Component

A catalyst component was prepared in the same manner as described in Example 9 except that the stirring rotation rate was changed to 300 rpm at the time of contact with methylhydrogenpolysiloxane. After completion of the reaction, the solid product formed was washed with n-heptane. A part of the solid product was sampled and the average particle size was measured to be 8.7 microns. The rotation rate corresponding to nf was 104 rpm, the stirring intensity thus being 2.9.

(2) Polymerization of Ethylene

By using the so-obtained catalyst component, polymerization of ethylene was carried out under the same conditions as described in Example 9, whereby was obtained 79 g of a polymer having a melt flow rate of 4.3 g/10 min, a bulk density of 0.46 g/cc and an average particle size of 182 microns.

EXAMPLE 15

(1) Preparation of Component (A)

The reaction of MgCl$_2$ with Ti(O—nC$_4$H$_9$)$_4$ for the production of the component (A) was carried out in the same manner as described in Example 9. After completion of the reaction, the temperature was lowered to 10° C. and at a stirring rotation rate of 20 rpm, 0.2 mole of SiCl$_4$ was introduced over a period of 1 hour and reaction was carried out at 30° C. for 3 hours. After completion of the reaction, the reaction product was amply washed with n-heptane. The average particle size was 17.6 microns and the Ti content was 3.53% by weight. The rotation number corresponding to nf was 106 rpm, the stirring intensity thus being 0.2.

(2) Polymerization of Ethylene

Polymerization was carried out under the same conditions as described in Example 9. As the result, 85 g of a polymer having a melt flow rate of 5.1 g/10 min, a bulk density of 0.39 g/cc and an average particle size of 421 microns was obtained.

EXAMPLE 16

Copolymerization of ethylene with butene-1 was conducted.

Polymerization was carried out under the same conditions as described in Example 9 except that an ethylene/butene-1 gaseous mixture containing 10% by volume of butene-1 was used instead of ethylene and the polymerization temperature was changed to 75° C., whereby was obtained 103 g of a polymer having a melt flow rate of 7.3 g/10 min, a bulk density of 0.41 g/cc and an average particle size of 526 microns.

EXAMPLE 17

(1) Synthesis of Component (A)

A flask having an inner diameter of 10 cm, the inner atmosphere of which had been amply substituted by nitrogen, was charged with 20 ml of n-heptane from which water and oxygen had been removed, and 0.1 mole of MgCl$_2$ and 0.2 mole of Ti(O—nC$_4$H$_9$)$_4$ were introduced into the flask and reaction was carried out at 95° C. for 1 hour. The diameter of a stirring vane used was 9 cm. After completion of the reaction, the temperature was lowered to 40° C. and 15 ml of methylhydrogenpolysiloxane was introduced into the flask and reaction was carried out at a stirring rotation number of 20 rpm for 3 hours.

After completion of the reaction, the solid product formed was washed with n-heptane, into a solid component (A). A part of the solid component (A) was sampled and the average particle size was measured according to the sedimentation method, and it was found that the average particle size was 28.2 microns.

The rotation rate corresponding to the floating limit stirring intensity (nf) was 97 rpm, the stirring intensity thus being 0.2.

(2) Preparation of Catalyst Component

The above-mentioned component (A) was introduced into a sufficiently purified flask, and a mixture of 4.4 ml of TiCl$_4$ (B) and 12 ml of methylhydrogenpolysiloxane in 50 ml of n-heptane was introduced into the flask at 30° C., and the reaction was carried out at 70° C. for 2 hours. After completion of the reaction, the reaction product obtained was washed with n-heptane to form a catalyst component of the present invention. The Ti content in this catalyst component was 14.3% by weight.

(3) Polymerization of Ethylene

A stainless steel autoclave provided with a stirred and a temperature-controlling device and having an inner volume of 1.5 liters was charged with 800 ml of n-heptane from which water and oxygen had been amply removed, and then, 100 mg of triethylaluminum and 5 mg of the catalyst component mentioned above were introduced into the autoclave.

The temperature was elevation to 85° C., and hydrogen was introduced under a partial pressure of 4 Kg/cm$^2$ and ethylene was introduced under a partial pressure of 5 Kg/cm2 so that the total pressure was 9 Kg/cm$^2$G. Polymerization was conducted for 3 hours. The polymerization conditions were kept constant during the polymerization. After completion of the polymerization, ethylene and hydrogen were purged, and the content was taken out from the autoclave. The polymer slurry was filtered, and the solid recovered was dried a whole day and night to obtain 73 g of a polymer having a melt flow rate of 3.2 g/10 min, a bulk density of 0.41 g/cc and an average particle size of 533 microns. The amount of particles having a size smaller than 63 microns was a trace, the amount of particles having a size smaller than 150 microns was 0.1% by weight, and the amount of particles having a size large than 1,000 microns was 0.6% by weight.

EXAMPLE 18

(1) Synthesis of Component (A)

In a flask purified in the same manner as described in Example 17 was introduced 40 ml of n-heptane purified in the same manner as described in Example 17, and MgCl$_2$ and Ti(O—nC4H9)$_4$ were introduced and reacted in the same manner as described in Example 17. The diameter of the stirring vane used was 6 cm. After completion of the reaction, the temperature was lowered to 40° C., and 30 ml of methylhydrogenpolysiloxane was introduced and reaction was carried out at a rotation number of 20 rpm for 3 hours. After completion of the reaction, the solid product formed was washed with n-heptane into a solid component (A). A part of the solid component (A) was sampled and the average particle size was measured according to the sedimentation method to be 30.7 microns.

The rotation rate corresponding to nf was 100 rpm, the stirring intensity thus being 0.20. The viscosity of the reaction system was 26.4 cP.

(2) Preparation of Catalyst Component

The above-mentioned component (A) was introduced into a flask sufficiently purified in the same manner as described in Example 17. A mixture of 11.5 ml of TiCl$_4$ with 10 ml of n-heptane was introduced into the flask at 0° C. over a period of 30 minutes, and reaction was carried out at 50° C. for 2 hours. After completion of the reaction, the reaction product was washed with n-heptane to obtain a catalyst component. The Ti content in the catalyst component was 10.7% by weight.

(3) Polymerization of Ethylene

Polymerization of ethylene was carried out under the same conditions as described in Example 17 except that 100 mg of triethylaluminum and 50 mg of diethylaluminum chloride were used instead of 100 mg of triethylaluminum, whereby was obtained 158.2 g of a polymer having a melt flow rate of 4.5 g/10 min, a bulk density of 0.41 g/cc and an average particle size of 778 microns.

EXAMPLE 19

(1) Synthesis of Component (A)

Into a flask purified in the same manner as described in Example 17 was introduced 10 ml of n-heptane purified in the same manner as described in Example 17, and MgCl$_2$ and Ti(O—nC4H9)$_4$ were introduced into the flask in the same manner as described in Example 17. Then, 0.7 ml of n-BuOH was introduced into the flask and reaction was carried out in the same manner as described in Example 17. The diameter of the stirring vane was 6 cm, and the stirring rotation rate was 20 rpm. After completion of the reaction, the reaction product was washed with n-heptane to form a component (A). The average particle size of the component (A) was 33.6 microns.

The rotation rate corresponding to nf was 96 rpm, the stirring intensity thus being 0.1. The viscosity of the reaction system was 37 cP.

(2) Preparation of Catalyst Component

The component (A) synthesized above was introduced in an amply purified flask, and a mixture of 3.2 ml of SiCl$_4$ with 10 ml of n-heptane was introduced at 30° C. over a period of 30 minutes into the flask. Reaction was carried out at 50° C. for 2 hours. Then, a mixture of 8.0 ml of TiCl$_4$ with 50 ml of n-heptane was introduced into the flask at 30° C. over a period of 30 minutes and reaction was carried out at 50° C. for 2 hours. After completion of the reaction, the reaction product was washed with n-heptane to form a catalyst component. The Ti content in the catalyst component was 5.72% by weight.

(3) Polymerization of Ethylene

Polymerization of ethylene was carried out under the same conditions as described in Example 17 except that the amount used of triethylaluminum was changed to 150 mg, whereby was obtained 217 g of a polymer having a melt flow rate of 4.7 g/10 min, a bulk density of 0.43 g/cc and an average particle size of 868 microns.

EXAMPLE 20

(1) Preparation of Catalyst Component

The component (A) was prepared in the same manner as described in Example 17. a mixture of 7.1 ml of SiCl$_4$ with 10 ml of n-heptane was introduced into the flask at 30° C. over a period of 1 hour and reaction was carried out at 50° C. for 2 hours. After completion of the reaction, the reaction product was washed with n-heptane to obtain a catalyst component. The Ti content in the catalyst component was 3.66% by weight.

(2) Polymerization of Ethylene

Polymerization of ethylene was carried out under the same conditions as described in Example 17 except that 200 mg of triisobutylaluminum was used instead of triethylaluminum, whereby was obtained 79 g of a polymer having a melt flow rate of 7.6 g/10 min, a bulk density of 0.45 g/cc and an average particle size of 525 microns.

EXAMPLE 21

Polymerization of propylene was carried out by using the catalyst component synthesized in Example 18.

A stainless steel autoclave provided with a stirrer and a temperature-controlling device and having an inner volume of 1.5 liters was charged with 500 ml of n-heptane, from which water an oxygen had been amply removed, 125 mg of triethylaluminum, 53.6 mg of diphenyldimethoxysilane and 15 mg of the catalyst component synthesized in Example 18. Then, 40 ml of $H_2$ was introduced into the autoclave and the temperature and pressure were elevated, and polymeriation was carried out under a polymerization pressure of 5 $Kg/cm^2G$ at a polymerization temperature of 75° C. for a polymerizaion time of 2 hours. After completion of the polymerization, the polymer slurry obtained was filtered, and the polymer separated was dried to obtain 94 g of a polymer. Furthermore, 5.3 g of a polymer was obtained from the filtrate. At the boiling heptane extraction test, it was found that the I.I. value of the whole product was 86.5% by weight. The melt flow rate was 10.6 g/10 min, the bulk density of the polymer was 0.43 g/cc, and the average particle size of the polymer was 381 microns.

EXAMPLE 22

A gas phase polymerization apparatus as disclosed in Example 1 of Japanese Patent Application Laid-Open Specification No. 57-73011 was used, and amply purified polyethylene powder was charged in the apparatus and 100 mg of triethylaluminum and 10 mg of the catalyst component synthesized in Example 17 were then introduced into the apparatus. Then $H_2$ was introduced under a partial pressure of 1.2 $Kg/cm^2$ and introduction of ethylene was started at 85° C. Polymerization was carried out at 85° C. under a total pressure of 9 $Kg/cm^2$ for 2.5 hours, whereby was obtained 159 g of a polymer having a melt flow rate of 1.7 g/10 min and an average particle size of 536 microns.

COMPARATIVE EXAMPLE 3

(1) Preparation of Catalyst Component

A catalyst component was prepared in the same manner as described in Example 17 except that the stirring rotation number was changed to 250 rpm at the time of contact with methylhydrogenpolysiloxane. After completion of the reaction, the formed solid component was washed with n-heptane, and a part of the solid component was sampled and the average particle size was measured to be 8.1 microns.

(2) Polymerization of Ethylene

By using the so-obtained catalyst component, polymerization of ethylene was carried out under the same conditions as described in Example 17, whereby was obtained 81 g of a polymer having a melt flow rate of 4.1 g/10 min, a bulk specific gravity of 0.45 g/cc and an average particle size of 177 microns.

EXAMPLE 23

(1) Preparation of Component (A)

The reaction of $MgCl_2$ with $Ti(O-nC_4H_9)_4$ for the production of the component (A) was carried out in the same manner as described in Example 17. After completion of the reaction, the temperature was lowered to 15° C. and at a stirring rotation number of 20 rpm, 0.2 mole of $SiCl_4$ was introduced over a period of 1 hour and reaction was carried out at 30° C. for 3 hours. After completion of the reaction, the reaction product was amply washed with n-heptane. The average particle size was 20.3 microns and the Ti content was 3.67% by weight. The rotation rate corresponding to nf was 98 rpm, the stirring intensity thus being 0.2. The viscosity of the reaction system was 27.4 cP.

(2) Polymerization of Ethylene

Polymerization was carried out under the same conditions as described in Example 17. Incidentally, the component (A) was directly used as the catalyst component. As the result, 83 g of a polymer having a melt flow rate of 5.5 g/10 min, a bulk density of 0.38 g/cc and an average particle size of 472 microns was obtained.

EXAMPLE 24

Copolymerization of ethylene with butene-1 was conducted.

Polymerization was carried out under the same conditions as described in Example 17 except that an ethylene/butene-1 gaseous mixture containing 10% by volume of butene-1 was used instead of ethylene and the polymerization temperature was changed to 75° C., whereby was obtained 109 g of a polymer having a melt flow rate of 7.1 g/10 min, a bulk density of 0.43 g/cc, an average particle size of 587 microns and a density of 0.920 $g/cm^3$.

EXAMPLE 25

(1) Preparation of Component (A)

A catalyst component (A) was prepared in the same manner as described in Example 17 except that the amount used of n-heptane was changed to 300 ml. After completion of the reaction, the solid product formed was washed with n-heptane into a solid component (A). A part of the solid component (A) was sampled and the average particle size was measured to be 13.6 microns.

The stirring rotation rate corresponding to nf was 112 rpm, and the viscosity of the reaction system was 8.8 cP.

(2) Preparation of Catalyst Component and Polymerization of Ethylene

A catalyst component was prepared by using the above-mentioned component (a) in the same manner as described in Example 17, and polymerization of ethylene was carrried out in the same manner as described in Example 17, whereby was obtained 84 g of a polymer having a melt flow rate of 3.3 g/10 min, a bulk density of 0.40 g/cc and an average particle size of 310 microns.

EXAMPLE 26

(1) Preparation of Catalyst Component

Into an amply purified flask was intorduced 50 ml of n-heptane, and the component (A) synthesized in Example 1 was introduced in an amount of 0.003 mole as Mg atom. Then, a mixture of 0.05 mole of $SiCl_4$ with 25 ml of n-heptane was introduced into the flask at 30° C. over a period of 30 minutes, and reaction was carried out at 70° C. for 1 hour. After completion of the reaction, the reaction product was washed with n-heptane. Then, a mixture of 0.004 mole of diheptyl phthalate with 25 ml of n-heptane was introduced into the flask at 70° C. over a period of 30 minutes, and reaction was carried out at 80° C. for 1 hour. After completion of the reaction, the reaction product was washed with n-heptane. Then, 25 ml of $TiCl_4$ was introduced into the flask and reaction was conducted at 100° C. for 3 hours. After completion of the reaction, the reaction product was amply washed with n-heptane. The Ti content in the catalyst component obtained was 2.41% by weight.

(2) Polymerization of Propylene

A stainless steel autoclave provided with a stirrer and a temperature-controlling device and having an inner volume of 1.5 liters was charged with 500 ml of n-heptane from which water and oxygen had been amply removed, 125 mg of triethylaluminum, 26.8 mg of diphenyldimethoxysilane and 15 mg of the catalyst component synthesized above. Then, 60 ml of $H_2$ was introduced into the autoclazve and the temperature and pressure were elevated, and polymerization of propylene was carried out under a polymerization pressure of 5 $Kg/cm^2G$ at a polymerization temperature of 75° C. for a polymerization time of 2 hours. After completion of the polymerization, the polymer slurry obtained was filtered, and the polymer separated was dried to obtain 215 g of a polymer. Furthermore, 0.51 g of a polymer was obtained from the filtrate. At the boiling heptane extraction test, it was found that the I.I. value of the whole product (hereinafter referred to as "T-I.I." was 98.3% by weight. The melt flow rate was 2.8 g/10 min, the bulk density of the polymer was 0.45 g/cc, and the average particle size of the polymer was 295 microns. The amount of particles having a particle size smaller than 63 microns was 0.3% by weight, and the amount of particles having a particle size larger than 1,000 microns was 0.1% by weight.

EXAMPLE 27

(1) Preparation of Catalyst Component

The component (A) synthesized in Example 9 was charged in the same amount as described in Example 26 into a flask amply purified in the same manner as described in Example 26. Then, 0.05 mole of $SiCl_4$ was charged into the flask at 30° C. over a period of 1 hour and reaction was carried out at 90° C. for 4 hours. After completion of the reaction product, the reaction product was washed with n-heptane. Then, a mixture of 0.003 mole of phthaloyl chloride with 25 ml of n-heptane was introduced into the flask at 70° C. over a period of 30 minutes, and reaction was carried out at 90° C. for 1 hour. After completion of the reaction, the reaction product was washed with n-heptane. Then, 0.01 mole of $SiCl_4$ was introduced into the flask and reaction was carried out at 100° C. for 6 hours. After completion of the reaction, the reaction product was amply washed with n-heptane to form a catalyst component. The titanium content in the catalyst component obtained was 1.38% by weight.

(2) Polymerization of Propylene

Polymerization of propylene was carried out in the same manner as described in Example 26 except that 26 mg of phenyltriethoxsilane was used instead of diphenyldimethoxysilane, whereby was obtained 185 g of a polymer having a T-I.I. value of 98.8% by weight, a melt flow rate of 4.5 g/10 min, a bulk density of 0.48 g/cc and an average particle size of 365 microns. The amount of particles having a particle size smaller than 63 microns was 0.1% by weight and the amount of particles having a particle size larger than 1,000 microns was 0.1% by weight.

EXAMPLE 28

(1) Preparation of Catalyst Component

The component (A) synthesized in Example 19 was charged in the same amount as described in Example 26 into a flask amply purified in the same manner as described in Example 26. Then, 0.065 mole of $SiCl_4$ was charged into the flask at 30° C. over a period of 30 minutes and reaction was carried out at 90° C. for 2 hours. After completion of the reaction product, the reaction product was washed with n-heptane. Then, a mixture of 0.0025 mole of phthaloyl chloride with 15 ml of n-heptane was introduced into the flask at 70° C. over a period of 30 minutes, and reaction was carried out at 95° C. for 1 hour. After completion of the reaction, the reaction product was washed with n-heptane. Then, 2.5 ml of $TiCl_4$ was introduced into the flask and reaction was carried out at 110° C. for 3 hours. After completion of the reaction, the reaction product was amply washed with n-heptane to form a catalyst component. The titanium content in the catalyst component obtained was 2.47% by weight.

(2) Polymerization of Propylene

Polymerization of propylene was carried out in the same manner as described in Example 26 except that 22 mg of phenyltriethoxysilane was used instead of diphenyldimethoxysilane, whereby was obtained 226 g of a polymer having T-I.I. value of 98.6% by weight, a melt flow rate of 3.2 g/10 min, a bulk specific gravity of 0.45 g/cc and an average particle size of 498 microns. The amount of particles having a particle size smaller than 63 microns was below 0.1% by weight and the amount of particles having a particle size larger than 1,000 microns was 0.4% by weight.

EXAMPLES 29 AND 30

A component (A) was prepared in the same manner as described in Example 26 except that a compound shown in Table 1 was used instead of methylhydrogenpolysiloxane. Polymerization of propylene was carried out in the same manner as described in Example26. The obtained results are shown in Table I.

TABLE 1

|  | Example 29 | Example 30 |
| --- | --- | --- |
| Precipitating agent in component (A) | $SiCl_4$ | 1,3,5,7-tetramethylcyclotetrasiloxane |
| Rotation rate (rpm) corresponding to nf | 98 | 98 |
| Average particle size (microns) | 14.6 | 18.5 |
| Amount (g) of polymer formed | 143 | 223 |
| T-I.I. value (% by weight) | 97.4 | 98.5 |
| Melt flow rate (g/10 min) | 4.8 | 3.3 |
| Bulk density (g/cc) | 0.40 | 0.46 |
| Average particle size (microns) | 272 | 306 |

EXAMPLE 31

A gas phase polymerization apparatus as disclosed in Example 1 of Japanese Patent Application Laid-Open Specification No.57-73011 was used, and amply purified polyethylene powder was charged in the apparatus. Then, 100 mg of triethylaluminum and 10 mg of the same catalyst component as used in Example 27 were introduced into the apparatus. Then, $H_2$ was introduced under a pressure of 1.2 Kg/cm$^2$ and introduction of ethylene was initiated at 85° C. Polymerization was carried out under a total pressure of 9Kg/cm$^2$ at 85° C. for 2.5 hours to obtain 136 g of polymer having a melt flow rate of 1.6 g/10 min and an average particle size of 381 microns.

EXAMPLE 32

The same apparatus as used in Example 31 was charged with amply purified polypropylene powder, and 100 mg of triethylaluminum, 21.4 mg of diphenyldimethoxysilane and 20 mg of the same catalyst component as used in Example 28 were introduced into the apparatus. Then, 1200 ml of $H_2$ was introduced and polymerization of propylene was carried out at 75° C. under 7 Kg/cm$^2$ for 2 hours to obtain 239 g of a polymer having a melt flow rate of 3.3 g/10 min, a T-I.I value of 98.7% by weight and an average particle size of 471 microns.

EXAMPLE 33

Copolymerization of ethylene with butene-1 was conducted.

The same apparatus as used in Example 31 was charged with polyethylene powder in the same manner as described in Example 31. By using the same catalyst component as used in Example 28, polymerization was carried out in the same manner as described in Example 31 except that an ethylene/butene-1 gaseous mixture comprising 10% by volume of butent-1 was used instead of ethylene and the polymerization temperature was changed to 80°) C., whereby was obtained 146 g of a polymer having a melt flow rate of 4.8 g/10 min, an average particle size of 488 microns and a density of 0.922 g/cm$^3$.

EXAMPLE 34

A component (A) was prepared in the same manner as described in Example 9 except that 0.25 mole of $Ti(OC_2H_5)_4$ was used instead of $Ti(O-nC_4H_9)_4$. The average particle size of the solid product formed as a solid component (A) was found to be 21.8 microns. A catalyst component was prepared by using the so-obtained component (A) in the same manner as described in Example 9, and polymerization of ethylene was carried out in the same manner as described in Example 9, whereby was obtained 63 g of a polymer having a melt flow rate of 4.8 g/10 min, a bulk density of 0.41 g/cc and an average particle size of 431 microns.

EXAMPLES 35 THROUGH 37

A catalyst component was prepared in the same manner as described in Example 26 except that a compound shown in Table 2 was used instead of diheptyl phthalate, and polymerization of propylene was carried out in the same manner as described in Example 26. The results obtained are shown in Table 2.

TABLE 2

| Exam. No. | Component (C) (amount used) | Yield (g) of Polymer | Melt Flow Rate (g/10 min) | Bulk Density (g/cc) | T-I.I. (% by weight) | Average Particle Size (microns) |
| --- | --- | --- | --- | --- | --- | --- |
| 35 | ethyl benzoate (0.0035 mole) | 138 | 8.3 | 0.42 | 91.6 | 408 |
| 36 | ethyl silicate (0.003 mole) | 142 | 9.7 | 0.43 | 90.8 | 411 |
| 37 | cyclohexane-1,2-dicarboxylic dichloride (0.003 mole) | 189 | 6.5 | 0.43 | 95.5 | 463 |

We claim:

1. A catalyst component for the polymerization of an olefin, which consist essentially of:
    a contact product of (A) a solid composition obtained by mixing a precipitating agent with a solution of a contact product of a magnesium dihalide and a titanium tetraalkoxide and/or a polymer thereof, the addition of the precipitating agent being conducted with stirring at a stirring intensity ranging from nf/15 to 2nf, wherein nf is the flotation limit stirring intensity of the reaction medium, with (B) a liquid titanium compound and/or halogen compound of silicon.

2. The catalyst component for polymerization of an olefin according to claim 1, wherein the mixing of the precipitating agent is carried out with stirring at a stirring intensity lower than nf but no lower than nf/10.

3. The catalyst component for polymerization of an olefin according to claim 1, wherein the mixing of the precipitating agent is carried out with stirring at a stirring intensity lower than nf but no lower than nf/10 while maintaining the viscosity of the reaction system at 20 to 50 centipoise.

4. The catalyst component for polymerization of an olefin according to claim 1, wherein the magnesium dihalide of the component (A) is magnesium dichloride.

5. The catalyst component of polymerization of an olefin according to claim 1, wherein the titanium compound in the component (A) is a titanium tetraalkoxide having 1 to 10 carbon atoms in each of the alkyl group.

6. The catalyst component for polymerization of an olefin according to claim 1, wherein the polymer of the titanium tetraalkoxide of the component (A) is represented by the following formula:

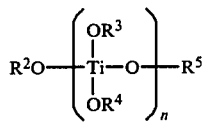

wherein R² through R⁵ stand for an aliphatic or aromatic hydrocarbon residue having 1 to 10 carbon atoms, and n is a number of from 2 to 20.

7. The catalyst component for polymerization of an olefin according to claim 1, wherein the solution of a contact product of the component (A) between the magnesium dihalide and the titanium tetraalkoxide and/or its polymer is in the form of a solution in a hydrocarbon medium.

8. The catalyst component for polymerization of an olefin according to claim 1, wherein the precipitating agent is a halide of an element selected from the group consisting of titanium and silicon.

9. The catalyst component for polymerization of an olefin according to claim 1, wherein the precipitating agent is a polymeric silicon compound having a viscosity of 0.1 to 100 centistokes and having recurring units represented by the following formula:

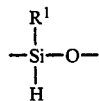

wherein R¹ stands for a hydrocarbon residue having 1 to 10 carbon atoms.

10. The catalyst component for polymerization of an olefin according to claim 1, wherein the liquid titanium compound as the component (B) is a compound represented by the formula $Ti(OR)_{4-n}X_n$ in which R stands for a hydrocarbon residue having 1 to 10 carbon atoms, X stands for a hydrogen atom and n is a number of from 0 to 4.

11. The catalyst component for polymerization of an olefin according to claim 1, wherein the halogen compound of silicon as the component (B) is a compound represented by the formula $R_{4-n}SiX_n$ in which R stands for a hydrogen atom or a hydrocarbon residue having 1 to 6 carbon atoms, X stands for a halogen atom and n is a number of from 1 to 4.

12. A catalyst component for polymerization of an olefin, which consists essentially of:
a contact reaction product of (A) a solid composition obtained by mixing a precipitating agent with a contact product between a magnesium dihalide and a titanium tetraalkoxide and/or a polymer thereof, the mixing of the precipitating agent being carried out with stirring at a stirring intensity ranging from nf/15 to 2nf, wherein nf is the flotation limit stirring intensity of the reaction medium, with (B) a liquid titanium compound and/or a halogen compound of silicon and (C) an electron doner.

13. The catalyst component for polymerization of an olefin according to claim 12, wherein the mixing of the precipitating agent is carried out with stirring at a stirring intensity no higher than 2nf but no lower than nf/15.

14. The catalyst component for polymerization of an olefin according to claim 12, wherein the mixing of the precipitating agent is carried out with stirring at a stirring intensity lower than nf but no lower than nf/10.

15. The catalyst component for polymerization of an olefin according to claim 12, wherein the mixing of the precipitating agent is carried out with stirring at a stirring intensity lower than nf but no lower than nf/10 while maintaining the viscosity of the reaction system at 20 to 50 centipoise.

16. The catalyst component for polymerization of an olefin according to claim 12, wherein the magnesium dihalide of the component (A) is magnesium dichloride.

17. The catalyst component for polymerization of an olefin according to claim 12, wherein the titanium compound in the component (A) is a titanium tetraalkoxide having 1 to 10 carbon atoms in the alkyl group.

18. The catalyst component for poylmerization of an olefin according to claim 12, wherein the polymer of the titanium tetraalkoxide of the component (A) is represented by the following formula:

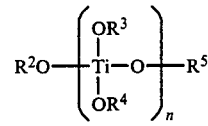

wherein R² through R⁵ stand for and aliphatic or aromatic hydrocarbon residue having 1 to 10 carbon atoms, and n is a number of from 2 to 20.

19. The catalyst component for polymerization of an olefin according to claim 12, wherein the solution of a contact product of the component (A) between the magnesium dihalide and the titanium tetraalkoxide and/or its polymer is in the form of a solution in a hydrocarbon medium.

20. The catalyst component for polymerization of an olefin according to claim 12, wherein the precipitating agent is a halide of an element selected from the group consisting of titanium and silicon.

21. The catalyst component for polymerization of an olefin according to claim 12, wherein the precipitating agent is a polymeric silicon compound having a viscosity of 0.1 to 100 centistokes and having recurring units represented by the following formula:

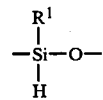

wherein R¹ stands for a hydrocarbon residue having 1 to 10 carbon atoms.

22. The catalyst component for polymerization of an olefin according to claim 12, wherein the liquid titanium compound as the component (B) is a compound represented by the formula Ti(OR)$_{4-n}$X$_n$ in which R stands for a hydrocarbon residue having 1 to 10 carbon atoms, X stands for a hydrogen atom and n is a number of from 0 to 4.

23. The catalyst component for polymerization of an olefin according to claim 12, wherein the halogen compound of silicon as the component (B) is a compound represented by the formula R$_{4-n}$SiX$_n$ in which R stands for a hydrogen atom or a hydrocarbon residue having 1 to 6 carbon atoms, X stands for a halogen atom and n is a number of from 1 to 4.

24. The catalyst component for polymerization of an olefin according to claim 12, wherein the electron donor as the component (C) is an alcohol having 1 to 18 carbon atoms.

25. A catalyst for polymerization of an olefin, which comprises a catalyst component as set forth in claim 1 or claim 13 and an organoaluminum compound.

* * * * *

UNITED STATES PATENT AND TRADEMARK OFFICE
CERTIFICATE OF CORRECTION

PATENT NO. : 4,703,026
DATED : OCTOBER 27, 1987
INVENTOR(S) : MITSUYUKI MATSUURA ET AL.

It is certified that error appears in the above-identified patent and that said Letters Patent is hereby corrected as shown below:

Column 25, line 52, replace "hydrogen" with

--halogen--.

Signed and Sealed this

Twenty-fifth Day of June, 1991

Attest:

HARRY F. MANBECK, JR.

Attesting Officer

Commissioner of Patents and Trademarks